Dec. 24, 1940.    J. H. FLETCHER    2,226,056
GLARE SHIELD
Filed Nov. 14, 1938
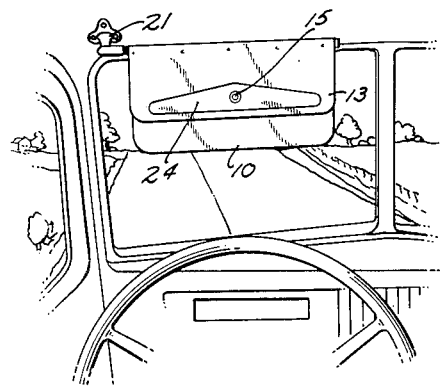
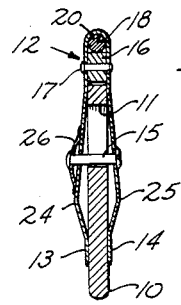
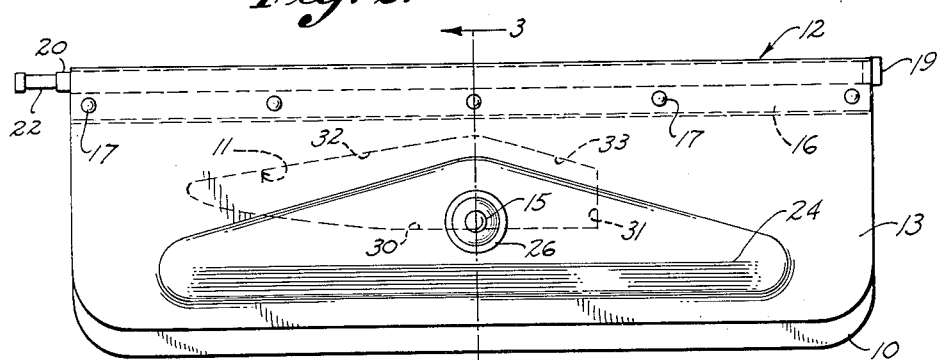
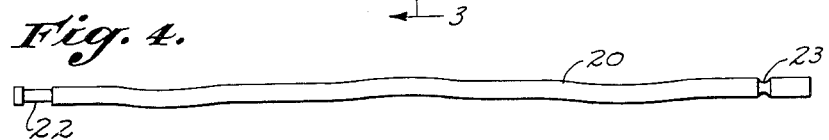
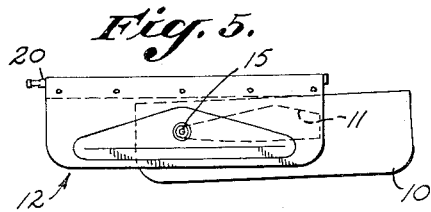
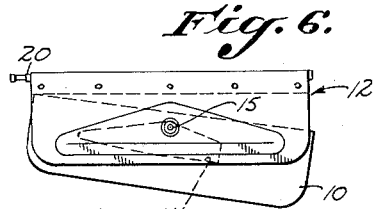
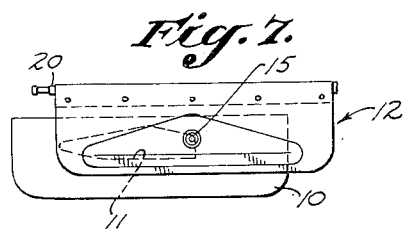
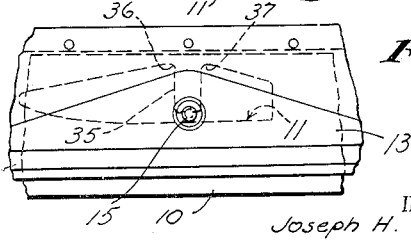
INVENTOR.
Joseph H. Fletcher,
BY Russell M. Otis
ATTORNEY.

Patented Dec. 24, 1940

2,226,056

UNITED STATES PATENT OFFICE 2,226,056

GLARE SHIELD

Joseph H. Fletcher, Southgate, Calif.

Application November 14, 1938, Serial No. 240,408

8 Claims. (Cl. 296—97)

This invention relates to a glare shield, and particularly to a glare shield adapted for use in vehicles to shield the eyes of the passengers from the direct light of the sun during those hours of the day when the sun is near the horizon, and from other objectionable light.

Non-extensible glare shields designed for this general purpose are now employed on automobiles and are ordinarily so mounted that they lie against the roof of the car when not in use and are folded down when they are desired to be used. Some mountings also permit the shield to be swung around to the side so that it shields the passengers' eyes from light entering through the side window. These shields are a great convenience, but oftentimes it is not possible to position them to intercept the objectionable light simply because the shields are not large enough or are limited in their travel. To make the shield larger, however, would be to make it unsightly and an obstacle when not in use. Various devices have been proposed which permit the area covered by the shield to be extended, but common faults of such devices have been that they are too cumbersome and complicated, and cannot be manufactured as cheaply as a glare shield must be if it is to be widely accepted in the automotive industry.

It is an object, therefore, of my invention to provide a glare shield which is extensible downwardly and to either side in order to permit it, while in use, to cover a relatively large area and to be compacted into a small space while not in use.

Another object is to provide an extensible glare shield in which the parts will remain in the relative position to which they are moved until they are again deliberately readjusted.

Another and very important object is to provide an extensible glare shield which is easy and cheap to manufacture, is attractive in appearance, and convenient in its operation.

These and other apparent objects are attained in a manner which will be clear from consideration of the following description taken in connection with the accompanying drawing, of which:

Fig. 1 shows the glare shield of my invention in use on an automobile. In this view the glare shield is turned down to cover part of the windshield and the movable shield element is pulled down to its extreme lower position.

Fig. 2 is a view of my glare shield in the closed or compacted relation of the parts.

Fig. 3 is a sectional view of the shield of Fig. 2 taken along the line 3—3, as indicated.

Fig. 4 shows a rod employed in my glare shield to connect with the supporting bracket.

Fig. 5 illustrates my glare shield with the movable shield element extended in the rightward direction.

Fig. 6 illustrates my glare shield with the movable shield element rotated downwardly at its right side.

Fig. 7 illustrates my glare shield with the movable shield element extended downwardly and to the extreme leftward position.

Fig. 8 is a partial view of my glare shield with an alternative form of movable shield element.

In the glare shield of my invention, I preferably provide a movable shield element 10 having an aperture 11 therethrough and a cooperating shield structure 12 providing sides 13 and 14 preferably frictionally engaging opposite sides of the shield element 10, and carrying a member 15 preferably extending through the aperture 11 to limit the travel of the shield element 10 relative to the structure 12.

The shield structure 12 preferably comprises a sheet of metal bent upon itself around a small radius to form the sides 13 and 14 which lie substantially parallel to one another and are spaced apart a distance substantially equal to the thickness of the shield element 10, providing a channel open at both ends and at the bottom for reception of the shield element 10. Near the top of the shield structure 12, a narrow spacer 16, preferably of pressed wood or other suitable material, and of a thickness equal to that of the shield element 10, is positioned between the sides 13 and 14 and is clamped therebetween by means of rivets 17. The spacer 16 preferably runs the entire length of the glare shield. The spacer 16 is preferably located below the bend 18, connecting the sides 13 and 14, a distance equal to twice the radius of the bend 18, and a rod 20 is inserted in the space between the bend 18 and the spacer 16 for connecting with a supporting bracket 21 attached to the vehicle. The rod 20 is preferably of slightly less radius than the bend 18 and is bent out of line at a number of places along its length, as shown in Fig. 4, so that when inserted in the shield structure 12, as shown in Fig. 2, it is frictionally gripped thereby but can still be rotated therein. The rod 20 is at its end peripherally grooved at 22 to facilitate securing it in the bracket 21 in a well known manner. In order to adapt my glare shield to use on as wide a variety of automobiles as possible I provide a groove 23 on the other end of the rod 20 which is designed to fit another popular style of supporting bracket. If the shield is to be used on a car having such other style of supporting bracket, the rod 20 is removed and reversed to leave exposed the groove 23. A small plug 19 having an enlarged head is inserted in the open end of the hole provided for the rod 20 and is frictionally retained therein.

The bracket 21 is preferably adapted to permit rotating the glare shield about a vertical axis so as to bring it in front of either the windshield or the side window, and in either of these positions the glare shield may be rotated around the rod 20 to take various angles relative to the line of sight or to fold it up against the roof of the car.

The shield element 10 is adapted to slide between the sides 13 and 14 and to be held in any position in which it is placed by friction acting between the shield element 10 and the sides 13 and 14 which contact it. In order to insure that the sides 13 and 14 frictionally engage the shield element 10 over the entire length thereof, the sides 13 and 14 are preferably stiffened longitudinally by being pressed outward to form triangularly shaped protuberances including ridges 24 and 25, respectively, running parallel to the lower edge of the shield. The retaining member 15 is preferably made in the form of a rivet which passes through holes in the sides 13 and 14 and through the aperture 11 in the shield element 10. Between the head of the rivet 15 and the side 13 is preferably placed a spring washer 26 which may be simply a cup-like washer made of resilient metal. The rivet 15, when in place, deflects the washer 26 and the sides 13 and 14 of the shield sufficiently to result in the sides 13 and 14 resiliently engaging the shield element 10 with sufficient frictional force to hold the shield element 10 in any position in which it is placed. If desired, a bolt may be substituted for the rivet 15 and the tension may be adjusted by tightening or loosening a nut on the bolt.

The shield element 10 is preferably a rectangular sheet of pressed wood or other suitable material, preferably light in weight, of about the same length as the shield structure 12 and in height a little greater than the distance between the spacer 16 and the lower edges of the sides 13 and 14, so that when the shield element 10 is in its extreme upper position, as shown in Fig. 2, the shield element 10 extends down below the sides 13 and 14 a sufficient distance to permit one to easily grip it between his fingers. It will be clear that the shield element 10 may be slid in any direction in the plane of the shield. The shield element may be moved in a longitudinal direction to the right or to the left from the position shown in Fig. 2, or downwardly in a transverse direction, to extend the area of the glare shield. The distance and angles through which the shield element 10 may be moved are determined by the shape and position of the aperture 11 in the shield element 10, the travel of the shield element 10 being limited by engagement of the rivet 15 with the wall of the aperture, and of the element 10 with the spacer 16. Thus the rivet 15 serves the double purpose of holding the sides of the shield structure 12 in tight frictional contact with the shield element 10 and of limiting the travel of the shield element 10.

The shape of the aperture 11 in the movable shield element 10 is adapted to permit the desired sideward movement of the shield element 10 to either side and to permit the greatest degree of rotation of the movable shield element in its own plane without exposing the aperture to view beyond the limits of the sides 13 and 14 in any position. With the shield element 10 in the position shown in Fig. 2, with the top of element 10 abutting the spacer 16 and the side edges coinciding with those of the shield structure 12, the aperture 11 is preferably so shaped as to have a lower wall 30 which extends farther to the left of the rivet 15 than to the right thereof, and which throughout most of its length lies just under the rivet 15. It will be clear that this permits the element 10 to be moved farther to the right than to the left from the central position of Fig. 2. This is illustrated by Fig. 5, in which the shield element 10 is in the extreme rightward position, and by Fig. 7, in which it is in the extreme leftward position.

In the extreme rightward position of Fig. 5 it is desirable to be able to rotate the element 10 in its own plane either up or down to cover a greater area through which objectionable light might enter. To permit such movement the leftmost portion of the wall 30 of the aperture 11 slopes upward gradually, causing the shield element 10 to be forced lower as it is moved in a rightward direction. Thus, in the extreme rightward position, the element 10 can be rotated upward until it abuts the spacer 16, as shown in Fig. 5, or can be rotated downward until the upper left corner abuts the spacer 16. In either of these positions it will be noted that no part of the aperture 11 is exposed to view.

At the extreme rightward end of the aperture 11 the aperture is bounded by a wall 31 extending substantially perpendicular to the upper and lower edges of the element 10 and to a point a little higher than the leftmost end of the wall 30. This permits the shield element 10 to be moved straight out to the left, or leftward and downward as shown in Fig. 7, wherein the rivet 15 is shown in the upper right corner of the aperture 11, or the shield element 10 may be rotated up or down from the position of Fig. 7 until it abuts the spacer 16. In any of these positions no part of the aperture 11 is exposed to view.

In order to permit the shield element 10 to be pulled downward, as shown in Fig. 1, the upper walls 32 and 33 of the aperture 11, connecting with the walls 30 and 31, respectively, rise to an apex near the top of the shield element 10 and located above the rivet 15 when the shield element 10 is centrally positioned, as in Fig. 2. The shield element 10 may be rotated from the position of Fig. 1 downward on the right side into the position shown in Fig. 6 in which the upper left corner of the shield element 10 abuts the spacer 16, or the element 10 may be rotated downward on the left side until the upper right corner thereof abuts the spacer 16. The apex formed at the juncture of the walls 32 and 33 is located low enough to prevent any of the aperture 11 being exposed to view when the shield element is in any of these positions.

It will be clear that the glare shield may be employed to cover the windshield as shown in Fig. 1, or rotated around to cover the side window of the automobile, and that in either of these positions the shield may be rotated up or down about the rod 20 to cause it to assume any of various angles relative to the line of sight, and that in any of these positions the movable shield element 10 may be slid to any of the positions above described, or to intermediate positions, relative to the shield structure 12. In any of these positions the shield element 10 is held, until deliberately readjusted, by the frictional engagement of the sides 13 and 14 with the shield element 10. In order to increase the friction between these parts and to enhance the attractiveness of the device, I preferably apply a fabric finish lacquer to the entire glare shield including the movable shield element 10. The dimensions of the various parts are preferably so proportioned that the shield element 10 in its extreme rightward position extends over to the middle of the windshield; in its extreme leftmost position, extends to cover that portion of the windshield between the main body of the glare shield and the door post; and in its lowermost position extends below the horizon for one sitting in the driver's seat. Another identical glare shield may be reversed and secured to a bracket on the other side of the car, if desired, to shield the eyes of the driver's companion.

In Fig. 8 is partially shown a glare shield in which the movable shield element 10 has an aperture 11 of somewhat different shape from that described above. In this form a portion of the shield element 10, preferably in the form of a narrow tongue 35 extending from the top walls of the aperture 11, is so shaped and dimensioned as to lie immediately above the member 15 when the shield element 10 is centrally located in the shield structure 12. The lower end of the tongue 35 is preferably concave as seen from the member 15. With this construction it is impossible for the shield element 10 to move downward with respect to the shield structure 12 while the shield element 10 is centrally located and it is therefore possible to reduce the force with which the sides 13 and 14 engage the shield element 10 without any danger of the shield element 10 being vibrated down when it is not wanted in its lowered position. As vibration tends to lower the shield element 10, the concave end of the tongue 35 comes to rest on the member 15 and the shield element 10 can go no further. If it is desired to lower the shield element 10 it is only necessary to move it longitudinally a little to one side or the other and pull it down, permitting the member 15 to rest in either of the corners 36 and 37. The distance between the end of the tongue 35 and the lower wall of the aperture 11 provides clearance over the member 15, so that the shield element 10 may be moved from side to side as in the other form described above.

It will be evident that the glare shield of my invention is one that is well adapted to production methods employed in large quantity production, which is extremely important if a device of this character is to be widely used. It is also apparent that my glare shield is attractive in appearance and efficient and convenient in operation.

It will be understood that various changes and modifications in design and construction may be made in my glare shield without departing from the spirit and scope of the invention defined in the appended claims.

I claim as my invention:

1. A glare shield comprising, in combination: a shield structure providing substantially parallel spaced sides; a shield element movably disposed between said sides and having an aperture therein; and means carried by said shield structure extending into said aperture; said aperture being so shaped as to prevent relative vertical movement of said shield element and said shield structure when said shield element is longitudinally located in a substantially central position relative to said shield structure, but to permit relative vertical movement when said shield element is displaced in a longitudinal direction from the position in which it is centrally located relative to said shield structure.

2. A glare shield comprising, in combination: a shield structure providing substantially parallel spaced sides; a movable shield element disposed between said sides and in frictional engagement therewith, said shield element having an aperture therein; and a member passing through said aperture and carried at opposite ends by said sides of said shield structure, said member limiting the travel of said shield element by engagement with the walls of said aperture; said aperture being so shaped as to prevent relative vertical movement of said shield element and said shield structure when said shield element is longitudinally located in a substantially central position relative to said shield structure, but to permit relative vertical movement when said shield element is displaced in a longitudinal direction from the position in which it is centrally located relative to said shield structure.

3. A glare shield comprising, in combination: a shield structure providing substantially parallel spaced sides; means carried by said shield structure for mounting said glare shield; a movable shield element disposed between said spaced sides and having an aperture therein; a member passing through said aperture and carried at opposite ends by said sides of said shield structure and limiting the travel of said shield element by engagement with the walls of said aperture; and a narrow tongue forming part of said shield element extending downwardly from the upper wall of said aperture nearly to said member in such manner as to substantially vertically confine said member between said tongue and the lower wall of said aperture when said shield element is centrally located in a longitudinal direction relative to said shield structure.

4. A glare shield comprising, in combination: a shield structure; a shield element of approximately the same longitudinal extent as said shield structure and disposed substantially parallel thereto, said shield element having a relatively large aperture therein, means associated with said shield structure frictionally engaging said shield element; and means attached to said shield structure and extending into said aperture, said aperture being relatively great in extent both longitudinally and transversely compared to said last-mentioned means in such manner as to permit both longitudinal and transverse translatory movement of said shield element relative to said shield structure so as to extend either longitudinally or transversely the area of said glare shield.

5. A glare shield comprising, in combination: a shield structure including approximately parallel spaced sides providing a channel therebetween which is open at both ends and at the bottom; a movable shield element disposed within said channel and having a relatively large aperture therein; and means carried by said shield structure and extending into said aperture, said means being considerably smaller than said aperture in both the longitudinal and transverse directions in such manner as to permit both longitudinal and transverse translatory movement of said shield element relative to said shield structure so as to extend either longitudinally or transversely the area of said glare shield.

6. A glare shield comprising, in combination: a shield element having a relatively large aperture therein; a cooperating shield structure including sides frictionally engaging opposite sides of said shield element, said sides being of approximately the same longitudinal extent as said shield element and forming a channel which is open at both ends and at the bottom; and a member passing through said aperture and carried at opposite ends by said sides of said shield structure, said aperture being of considerably greater extent than said member in both the longitudinal and transverse directions in such manner as to permit said shield element to be moved with translatory motion both longitudinally and transversely relative to said shield structure to extend either longitudinally or transversely the area of said glare shield.

7. A glare shield comprising, in combination: a shield element having a relatively large aperture therein; a cooperating shield structure including sides frictionally engaging opposite sides of said shield element and forming a channel which is open at both ends and at the bottom, said sides having approximately the same longitudinal length as said shield element; and a member secured in said shield structure and passing through said aperture, limiting the travel of said movable shield element; said aperture being relatively great in extent both longitudinally and transversely compared to said member in such manner as to permit both longitudinal and transverse translatory movement of said shield element relative to said shield structure so as to extend either longitudinally or transversely the area of said glare shield, and said aperture being so proportioned and located relative to said member and said shield structure that said aperture is not exposed to view in any possible position of said movable shield element.

8. A glare shield comprising, in combination: a shield member formed of a sheet of metal bent upon itself to form spaced sides providing a channel therebetween which is open at both ends and at the bottom; a spacer clamped between said sides near the bend in said shield member; a rod frictionally retained in the space between said spacer and the bend in said shield member and adapted to connect with a supporting bracket; a movable shield element of approximately the same longitudinal length as said sides and positioned in said channel in frictional engagement with said sides, said shield element having a relatively large aperture therein; a retaining member secured in the sides of said shield member and passing through said aperture, said retaining member holding said sides in close contact with said shield element; the travel of said movable shield element being limited by engagement of said retaining member with the wall of said aperture and by abutment of said shield element against said spacer, said aperture being relatively great in extent both longitudinally and transversely compared to said retaining member in such manner as to permit both longitudinal and transverse translatory movement of said shield element relative to said shield member so as to extend either longitudinally or transversely the area of said glare shield, and said aperture being so proportioned and located relative to said retaining member and said shield member that said aperture is not exposed to view in any possible position of said movable shield element.

JOSEPH H. FLETCHER.